May 6, 1941.  D. A. MEAD  2,240,709
OSCILLATION JOINT
Filed Sept. 6, 1938
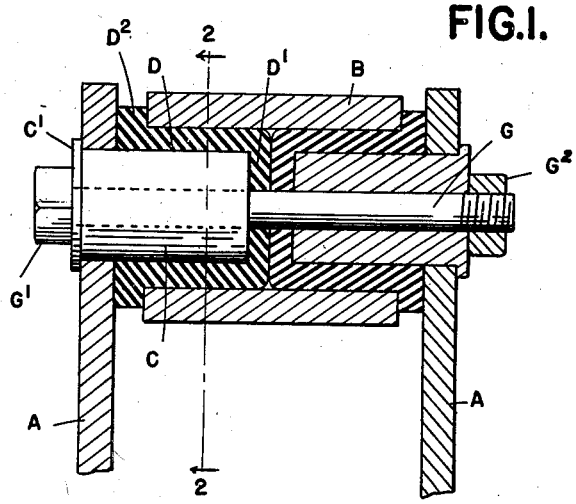
FIG.I.
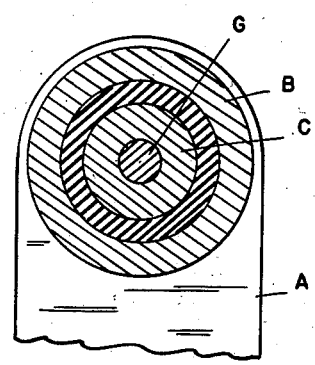
FIG.2.
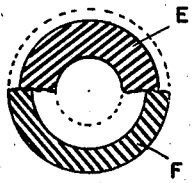
FIG.3.
INVENTOR
DELL A. MEAD
BY
*Whittemore Hulbert & Belknap*
ATTORNEYS Patented May 6, 1941

2,240,709

UNITED STATES PATENT OFFICE 2,240,709

OSCILLATION JOINT

Dell A. Mead, Detroit, Mich.

Application September 6, 1938, Serial No. 228,692

3 Claims. (Cl. 287—85)

The invention relates to pivotal joints more particularly designed to permit an oscillation through a restricted angle. As a specific example, a shackle used in the mounting of a vehicle spring requires a pivotal connection, but the maximum amplitude of angular movement is relatively small. It is the object of the invention to obtain a construction which will permit the required oscillation, but of such a character as to avoid noise and wear or the necessity for adjustment.

In the present state of the art various constructions of oscillation joints have been devised in which a sleeve of rubber or other resilient material is placed intermediate the relatively movable members. With such constructions it has been customary to place the rubber sleeve under compression and to therefore transmit stresses therethrough while in this compressed condition. It is, however, a fact not recognized in connection with these constructions, that rubber when placed under compression is not in a desirable condition for the transmission of shear stresses therethrough as is required where members spaced thereby are relatively moved. I have, therefore, designed an oscillation joint of such a construction that the rubber or other resilient material through which shear stresses are transmitted is initially placed under tension, while at the same time it completely fills the space between the relatively movable members of the joint and is fixedly attached thereto.

While my invention is applicable to oscillation joints for various purposes, I have specifically illustrated the same as applied to a shackle, and in the drawing:

Figure 1 is an axial section partly in elevation through my improved joint;

Figure 2 is a transverse section on line 2—2 of Figure 1;

Figure 3 is a similar section through the resilient bushing showing one-half in its original form and the other half in its expanded condition to be placed under tension.

As illustrated, A are the spaced links of a shackle and B a cylindrical bearing such as the spring eye to which said links are pivotally attached. The attachment means comprises hollow cylindrical members C projecting inward from the links A and either formed integral therewith or as shown pressed into engagement with apertures therein from the outside thereof, each being provided with a limiting shoulder C'. Surrounding the inwardly projecting portions of the members C are bushings D formed of rubber or other resilient material having similar characteristics. These bushings are each provided at one end with an inwardly extending radial flange D' and at the opposite end with a radially outwardly extending flange $D^2$. The dimensions of the bushing as originally formed differ from those in the assembled structure so that during the process of assembly the portion which is intermediate the members C and the surrounding bearing B, is stretched out to be placed under tension. However, the volume of the original structure is such that in the extended and tensioned form the space between the outer and inner members B and C is completely filled.

One method by which the bushing D may be stretched and placed under tension is illustrated in Figure 3 where the portion E is a cross section of the unexpanded bushing and the portion F a cross section of the expanded bushing. It will be noted that the portion E has both its inner and outer surface curves of smaller radius than the corresponding surfaces of the expanded bushing. Also, the thickness of the wall in portion E is greater than that in the portion F, so that the volume is the same. The expansion is effected by pressing the members C into the bushing while the flanges D' and $D^2$ are held against axial contraction. A bolt G extending through the hollow members C having a head G' at one end and a clamping nut $G^2$ at the opposite end serves to hold the parts in assembled relation. In this position the flanges D' of the two bushings are clamped against each other and remain in fixed relation to the members C while the flanges $D^2$ are clamped between the links A and the ends of the bearing D.

With the construction described, when the links A are swung this will oscillate the members C with respect to the bearing B and the bushings D therebetween will be subjected to shear stresses. The outer and inner surfaces of these bushings will, however, maintain fixed contact respectively with the members B and C, the intermediate portions of the rubber being circumferentially displaced. There will also be a displacement in the flange $D^2$ intermediate its faces which contact respectively with the link A and end of the bearing B. Due to the fact that the rubber is initially tensioned in the plane of shear, the relative displacement will be effected without detrimental effect on the material.

What I claim as my invention is:

1. An oscillation joint comprising inner and outer concentric spaced members, a bushing having radially extending flanges at opposite ends thereof clamped to hold the same from axial contraction, said body being simultaneously circumferentially and axially stretched to be under tension also completely filling the space between said members and having its opposite faces respectively in fixed contact therewith.

2. An oscillation joint comprising inner and outer concentrically spaced members, a resilient bushing filling the space therebetween and with its opposite faces respectively in fixed contact therewith, said bushing being simultaneously circumferentially and axially stretched to be under tension and with all portions of its opposite ends anchored to prevent axial contraction.

3. An oscillation joint comprising a cylindrical eye member, a pair of cylindrical members inserted in said eye member from opposite ends thereof leaving an annular space therebetween, a pair of bushings respectively engaging said cylindrical members and inserted therewith in said eye member, said bushings being provided with inwardly extending radial flanges clamped between said members and outwardly extending radial flanges overlapping the ends of said cylindrical eye member, flanges on said cylindrical members engaging the opposite faces of said radially outwardly extending flanges, and means for clamping said cylindrical members to each other, said bushings being circumferentially stretched to be under tension and of a volume to completely fill the annular space between said cylindrical members and eye with their opposite faces respectively in fixed contact therewith.

DELL A. MEAD.